United States Patent
Hofmann et al.

[11] Patent Number: 5,884,475
[45] Date of Patent: Mar. 23, 1999

[54] METHOD AND DEVICE FOR INTRODUCING LIQUID INTO AN EXHAUST-GAS PURIFICATION SYSTEM

[75] Inventors: Lothar Hofmann, Burgkunstadt; Ronald Neufert; Wieland Mathes, both of Michelau, all of Germany

[73] Assignee: Siemens Aktiengesellschaft, Munich, Germany

[21] Appl. No.: 816,365

[22] Filed: Mar. 13, 1997

Related U.S. Application Data

[63] Continuation of PCT/DE95/01248, Sep. 12, 1995.

[30] Foreign Application Priority Data

Sep. 13, 1994 [DE] Germany ............ 44 32 577.0
Sep. 13, 1994 [DE] Germany ............ 44 32 576.2

[51] Int. Cl.⁶ .................................................. F01N 3/00
[52] U.S. Cl. ................... 60/274; 60/206; 60/301; 60/303
[58] Field of Search ............... 60/302, 299, 301, 60/286, 303, 274

[56] References Cited

U.S. PATENT DOCUMENTS

| | | | |
|---|---|---|---|
| 4,522,082 | 6/1985 | Hasegawa et al. | 60/286 |
| 4,615,173 | 10/1986 | Usui et al. | 60/286 |
| 4,982,565 | 1/1991 | Projahn | 60/303 |
| 4,991,396 | 2/1991 | Goerlich et al. | 60/303 |
| 5,522,218 | 6/1996 | Lane et al. | 60/274 |

*Primary Examiner*—Thomas E. Denion
*Attorney, Agent, or Firm*—Herbert L. Lerner; Laurence A. Greenberg

[57] ABSTRACT

Nitrogen oxides emitted by an internal-combustion engine operated with excess air are normally converted by the method of selective catalytic reduction by bringing the nitrogen oxides, together with ammonia, into contact with a selective catalyst. Due to the dangers associated with the use of ammonia, in a motor vehicle ammonia should only be carried in the form of a substance which liberates ammonia, generally an aqueous urea solution. A method and a device for introducing liquid into an exhaust-gas purification system according to the invention avoids frost damage to sections of the system during shutdown times and permits operation of the system at temperatures below the freezing point of the reducing agent solution being used. The method and device include a (thermally insulated) reservoir for the reducing agent liquid and a liquid supply line which is connected thereto and terminates in an outlet opening for the liquid. The reservoir and the liquid supply line can be heated. Furthermore, a heater is provided for liquefying a starting volume which is small as compared with the volume of the reservoir. The liquid supply line may also have a back-flush valve to which a gas that is under pressure can be applied. The supply line can consequently be blown free.

27 Claims, 3 Drawing Sheets

METHOD AND DEVICE FOR INTRODUCING LIQUID INTO AN EXHAUST-GAS PURIFICATION SYSTEM

CROSS-REFERENCE TO RELATED APPLICATION

This application is a Continuation of International Application Serial No. PCT/DE95/01248, filed Sep. 12, 1995.

BACKGROUND OF THE INVENTION

Field of the Invention

The invention relates to a method for operating an exhaust-gas purification device in the exhaust of a combustion system, in particular in the exhaust of an internal-combustion engine of a motor vehicle, into the exhaust gas of which a liquid that is drawn from a reservoir through a supply line is introduced during the combustion, for chemical purification of the exhaust gas. Such a method is disclosed in Published European Patent Application 0 577 853 A1.

The invention also relates to a device for introducing a liquid into an exhaust-gas purification device, including a reservoir for the liquid and a supply line, connected thereto, for the exhaust-gas purification device.

The invention is also suitable for heating systems and other stationary combustion systems, provided they make provision for the purification of the exhaust gas in such a way that a liquid (such as, for example, urea solution) is introduced into the exhaust gas in sprayed or nebulized form or in another manner, as is provided, for example, in the catalytic purification of some industrial exhaust gases. In that connection, the introduction of the liquid may be a problem if, after a prolonged operating stoppage, the temperature has dropped so far that the liquid has an unduly high viscosity or is completely frozen. However, the invention is primarily intended for internal-combustion engines in motor vehicles.

In order to reduce the pollutants contained in the exhaust gas of an internal-combustion engine, in particular the nitrogen oxides, the principle of the regulated or controlled Diesel catalytic converter (CDC) has proved advantageous. That procedure is used primarily in internal-combustion engines which are operated with an excess of air, such as, for example, Diesel engines and lean-running engines. The procedure, which is based essentially on the method of selective catalytic reduction (SCR) is disclosed in numerous publications and patent applications, for example in German Published, Non-Prosecuted Patent Application DE 43 09 891 A1, corresponding to U.S. application Ser. No. 08/490, 115, filed Jun. 12, 1995; German Published, Non-Prosecuted Patent Application DE 43 10 926 A1; and German Published, Non-Prosecuted Patent Application DE 43 15 278 A1, corresponding to U.S. application Ser. No. 08/551, 791, filed Nov. 7, 1995. In the case of the SCR method, the nitrogen oxides, together with ammonia, are brought into contact with a selective catalyst and catalytically converted into environmentally safe nitrogen and water.

Due to the danger associated with the use of ammonia, namely the toxicity, and because of the nasal nuisance caused by ammonia, ammonia should not be carried in the motor vehicle in the case of an internal-combustion engine equipped with a CDC system. Instead of ammonia, an aqueous urea solution is carried in the motor vehicle as a reducing agent for the catalytic conversion of the nitrogen oxides. Ammonia is always produced from the aqueous urea solution by hydrolysis in the exact quantity instantaneously required to convert the nitrogen oxides.

It is an advantage of the substances, such as urea, for example, which are present in aqueous solutions and liberate ammonia, that the storing, manipulation, conveyability and meterability are particularly easy to solve technically. A serious disadvantage of those aqueous solutions is that there is a danger of freezing at certain temperatures as a function of the concentration of the dissolved substance.

The simple addition of an antifreeze founders because no antifreeze is known for such aqueous solutions, which effects an appreciable lowering of the freezing point in economical doses. Moreover, if an additional substance, such as an antifreeze, is used in that case, there is generally the danger that, in conjunction with the use of a reducing agent in the exhaust-gas purification system, undesirable byproducts are produced which are emitted along with the exhaust gas. For that reason, antifreezes cannot be used in such a method for exhaust-gas purification.

A further possibility for avoiding the freezing of the aqueous solution and for avoiding frost damage is in principle to heat those parts of the exhaust-gas purification system which carry reducing agent. However, in the case of mobile applications, especially utility motor vehicles (trucks), locomotives and ships (insofar as they are not provided with an internal energy supply), the electrical energy necessary for that purpose is not available, in particular during prolonged shutdown times. Thus, for example, a volume of about 100 l of aqueous urea solution would have to be protected against freezing in the case of a truck.

SUMMARY OF THE INVENTION

It is accordingly an object of the invention to provide a method and a device for introducing liquid into an exhaust-gas purification system in such a way that frost damage to the exhaust-gas purification system in which the liquid is sprayed into the exhaust gas is avoided during shutdown times. As a result, the operation of such a system is intended to be possible even at temperatures below the freezing point of the liquid being used.

With the foregoing and other objects in view there is provided, in accordance with a first embodiment of the invention, a method for operating an exhaust-gas purification device, which comprises drawing a liquid from a reservoir through a supply line; introducing the liquid into an exhaust gas in an exhaust of a combustion system during combustion, for chemical purification of the exhaust gas; and draining at least a section of the supply line with a pressurized gas during a shutdown of the combustion system.

The supply line therefore cannot freeze and be damaged in the process. It is available for a restart even at low temperatures.

In accordance with another mode of the invention, there is provided a valve which opens into the supply line between the reservoir and the exhaust of the combustion system. Thus, it is easily possible, on one hand, to drain the part of the supply line situated between the gas inlet and the reservoir into the reservoir by using the pressurized gas and, on the other hand, to also drain the part of the supply line situated between the gas inlet and the exhaust into the exhaust by using the pressurized gas.

With the objects of the invention in view, there is also provided a second embodiment of a method of operating an exhaust-gas purification device, which comprises drawing a liquid through a supply line from a reservoir having a given volume; introducing the liquid into an exhaust gas in an exhaust of a combustion system during combustion, for chemical purification of the exhaust gas; and heating a starting volume of the liquid being smaller than the given volume with a heater and introducing the starting volume, such as from a container, into the exhaust gas, during or shortly before startup of the combustion system.

With the objects of the invention in view, there is additionally provided a device for operating an exhaust-gas purification device, comprising a reservoir for a liquid; a supply line connected between the reservoir and an exhaust-gas purification device; a pressurized-gas inlet; and a valve connected between the pressurized-gas inlet and the supply line for introducing pressurized gas into the supply line.

The pressurized gas can be introduced through the valve into the supply line in the direction of the reservoir. This direction is opposite to the operative flow direction of the liquid and the valve therefore serves for "back-flushing" ("back-flush valve").

In accordance with another feature of the invention, the valve is itself formed as a back-flush valve, i.e. as a valve configuration which keeps the supply line open in the direction running from the reservoir to the exhaust-gas purification system during normal operation, but during shutdown opens the reverse flow direction to a gas which is under pressure, i.e. back into the reservoir.

In accordance with still another feature of the invention, the valve has a first state permitting a flow through the supply line from the reservoir to the exhaust-gas purification device and a second state permitting a flow through the supply line from the pressurized-gas inlet to the reservoir.

In accordance with still a further feature of the invention, the valve has a third state in which the reservoir is closed.

In accordance with still an added feature of the invention, the valve configuration has a state in which the pressurized gas inlet is connected to the exhaust-gas purification device.

In accordance with a further feature of the invention, the reservoir is thermally insulated.

In this way, it is possible, at any desired instant, to flush the liquid present in the liquid supply line back into the reservoir through the use of the gas under pressure and/or to flush it out through the outlet opening for the liquid. Utility motor vehicles, in particular, have a pressurized-air system which can be connected to the back-flush valve. In this way, it is possible to carry out the back-flushing of the liquid, for example of an aqueous reducing agent solution, through the use of the pressurized air present in the motor vehicle immediately after parking the motor vehicle. The thermal insulation of the reservoir is intended to prevent the liquid present in the reservoir and the liquid back-flushed into the reservoir from freezing even after short operating shutdowns, as frequently occurs.

In accordance with an added feature of the invention, the liquid supply line and, optionally, further components connected in the liquid supply line, such as a valve, a filter and a pump, for example, can be of back-flushable construction. This ensures that no liquid remains in the entire liquid pipe system between the reservoir and the outlet opening after back-flushing.

In accordance with an additional feature of the invention, the back-flush valve is a three/three-way valve. In this way, the liquid contained in the liquid supply line can be flushed in both flow directions. In addition, the liquid can be atomized, for example, when it is introduced into the flow medium at the outlet opening through the use of the pressurized air which is introduced into the liquid supply line through the back-flush valve.

In accordance with yet another feature of the invention, the path of the liquid supply line between the back-flush valve and the outlet opening is particularly short as compared with the total length of the liquid supply line. This is advantageous, for example, when only loading a catalytic converter disposed in the line for the flow medium in the flow direction of the flow medium downstream of the outlet opening to a small extent with a quantity of liquid during flushing. This is also understood as meaning that the back-flush valve is disposed directly alongside the outlet opening, that is to say no further section of the liquid supply line is disposed between outlet opening and back-flush valve.

In accordance with yet a further feature of the invention, a fractional volume of the liquid which is small as compared with the volume of the reservoir is heated by a heater as a starting volume when the combustion system is started up or shortly before it is started up. Advantageously, the liquid supply line which terminates in an outlet opening for the liquid can also be heated.

In accordance with yet an added feature of the invention, the reservoir and the liquid supply line are heated by a heater which liquefies a starting volume of the liquid that is small as compared with the volume of the reservoir, even at temperatures which result in the solidification of the liquid.

In this way, it is possible to avoid frost damage to the reservoir and to the liquid supply line. In the first variant of the invention, the supply line is drained of the liquid after the combustion system is shut down and can therefore not freeze, but is available for the next start. According to the second variant the heater (for example an additional electrical heater regulated through the use of a thermostat) is capable of continuously keeping available, in a state ready for operation, the supply line and that quantity of liquid which is required prior to the combustion system heating up. It is also possible, in particular, to combine both variants with one another.

Thus, for example, the device, which is preferably a component of an exhaust-gas purification system of a utility motor vehicle having an internal-combustion engine, in particular an internal-combustion engine operated with an excess of air, can be particularly rapidly put into operation again even after prolonged shutdown times of the utility motor vehicle at outside temperatures below the freezing point of the liquid, because only a small heating power is needed to liquefy the starting volume even in the case of frozen liquid. Thus, for example, a starting volume of up to only 2 l is necessary in the case of a truck. On the other hand, the reservoir for the liquid, in this case an aqueous urea solution, in this case has a volume of about 50 to 100 l.

In accordance with yet an additional feature of the invention, the starting volume is stored in a separate container. This achieves a substantial thermal decoupling of the starting volume from the remaining liquid volume kept available in a tank. Due to this substantial decoupling, only a comparatively small heating power is necessary to thaw the starting volume so that an electrical heater can advantageously be provided to heat the starting volume.

In accordance with again another feature of the invention, the reservoir (or at least the tank mentioned above) and the liquid supply line can be heated through the use of a liquid heating medium. If the device is used in a utility motor vehicle having an internal-combustion engine operated with an excess of air, the coolant of the internal-combustion engine can, for example, be used to heat the reservoir and the liquid supply line. This means in particular that, for a heater operated in this way, virtually no additional electrical energy has to be provided from the vehicle battery of the utility motor vehicle. This is applicable with the exception of small quantities of energy, for example for establishing a suitable coolant flow rate.

In accordance with again a further feature of the invention, there is provided a device assigned to the reservoir for temperature monitoring and/or temperature control. In this way, it is possible, for example, not to overheat or locally vaporize the liquid contained in the reservoir. A device for temperature monitoring is understood as meaning temperature sensors such as, for example, thermocouples, resistance thermometers and the like. Devices for temperature control are, for example, a heat exchanger heated through the use of the coolant of the internal-combustion engine, with the quantity of coolant flowing through the heat exchanger per unit time being controlled through the use of an adjustable valve. In this connection, the adjustable valve can be controlled, for example, directly or indirectly by the signals of the device for temperature monitoring.

In accordance with again an added feature of the invention, in order to reliably avoid frost damage to the device during the shutdown times of a utility motor vehicle at temperatures below the freezing point of the liquid, for example an aqueous urea solution, the liquid supply line is provided with a back-flush valve to which a gas that is under pressure can be applied. In this way, the liquid supply line and other components disposed in the liquid supply line are kept free of liquid. The latter would otherwise cause damage as a result of the increase in volume occurring during freezing.

Other features which are considered as characteristic for the invention are set forth in the appended claims.

Although the invention is illustrated and described herein as embodied in a method and a device for introducing liquid into an exhaust-gas purification system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
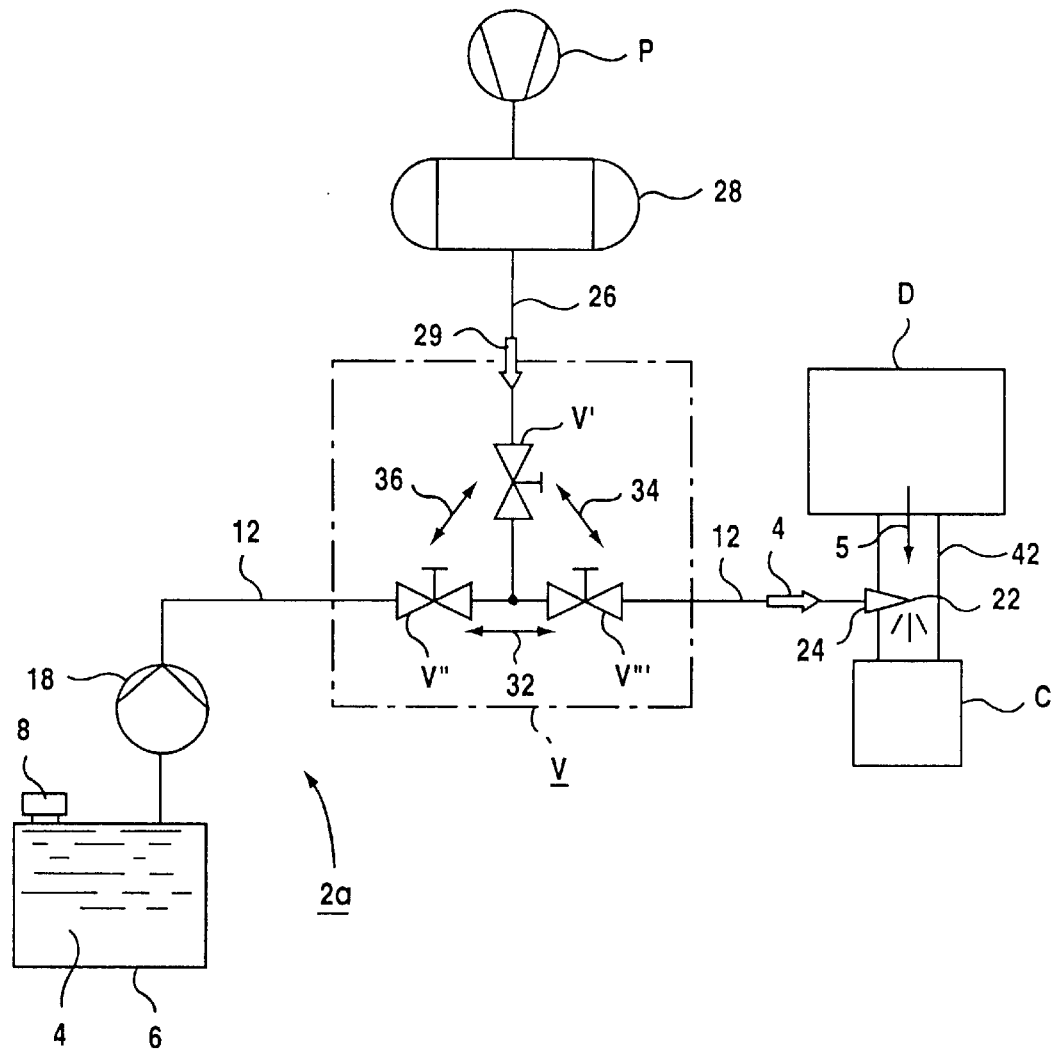
FIG. 1 is a schematic and block circuit diagram of a first embodiment of the invention.

Referring now to the figures of the drawings in detail and first, particularly, to FIG. 1 thereof, there is seen a Diesel engine D as a preferred application example of a combustion system. Exhaust gas 5 from the Diesel engine D is fed in a device 2a through an exhaust-gas line or exhaust 42 to a catalytic converter C for reducing a proportion of nitrogen oxide by reduction using a urea solution 4. The catalytic converter C may be referred to as an exhaust-gas purification device. The urea solution 4 is contained initially in a container 6 having a venting device 8. The urea solution 4 can be fed through the use of a feed pump 18 through a supply line 12 to an outlet opening 22 leading into the exhaust-gas line 42. A compression pump P feeds a pressurized-gas container 28 from which a pressurized-gas supply line 26 can feed pressurized gas 29 to the liquid supply line 12. Pressurized air can be especially used as the pressurized gas 29.

Figure 2:
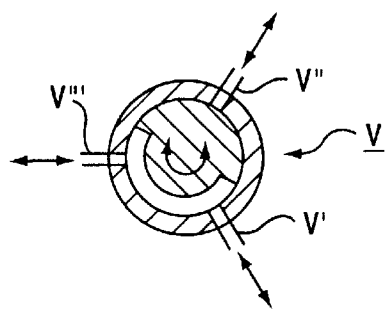
FIG. 2 is a cross-sectional view of a mechanical multi-way valve which can be used as a back-flush valve in a liquid supply line according to FIG. 1.

The pressurized gas 29 is supplied from the container 28 through a valve configuration V, which includes valves V', V" and V''' according to FIG. 1. According to FIG. 2, the valves V', V" and V''' may also be individually closable connections. The pressurized-gas supply line 26 can be shut off through the use of the valve V' so that in accordance with this function (shown as an arrow 32 in FIG. 1) the aqueous urea solution 4 is fed out of the container 6 through the line 12 to the outlet opening 22 in the exhaust-gas line 42.

The feed pump 18 can be formed, in particular, as a back-flushable pump, i.e. a flow can also take place through the pump 18 against the feed direction after shutting down.

If the combustion system, i.e. the Diesel engine D is turned off, for example by turning the ignition key, the valve V' is opened and the pressurized gas 29 is released from the container 28, but the outlet opening 22 in the path of the exhaust-gas 5 is blocked (for example by closing the valve V'''). In this function, which is shown as an arrow 36, the pressurized gas 29 from the container 28 flushes the urea solution 4 out of the line 12 back into the container 6. As a result of opening the valve V''' and closing the valve V", the pressurized-gas container 28 can then also be drained through the outlet opening 22 into the exhaust-gas line 42 and consequently into the catalytic converter C, which is a function shown as an arrow 34. In a subsequent rest position, which again corresponds to the function 32, the supply line 12 serves as a pressure equalization line in order to vent the container 6 and the pump 18. However, a separate non-illustrated pressure equalization line can also be provided. The supply line 12 can then remain blocked in the rest position.

Various constructions are possible for the multi-way valve V. In principle it is sufficient that the pressurized-gas supply line 26 is closed during normal operation of the combustion system D, but is open when the system D and the pumps 18 and P are shut down so that the pressurized-gas container 28 drains simultaneously into the exhaust-gas line 42 and into the container 6. It is possible, in particular, to control the valve configuration V and the pumps 18 and P through the use of a vehicle computer 100 of the respective motor vehicle, which is shown in FIG. 3.

Figure 3:
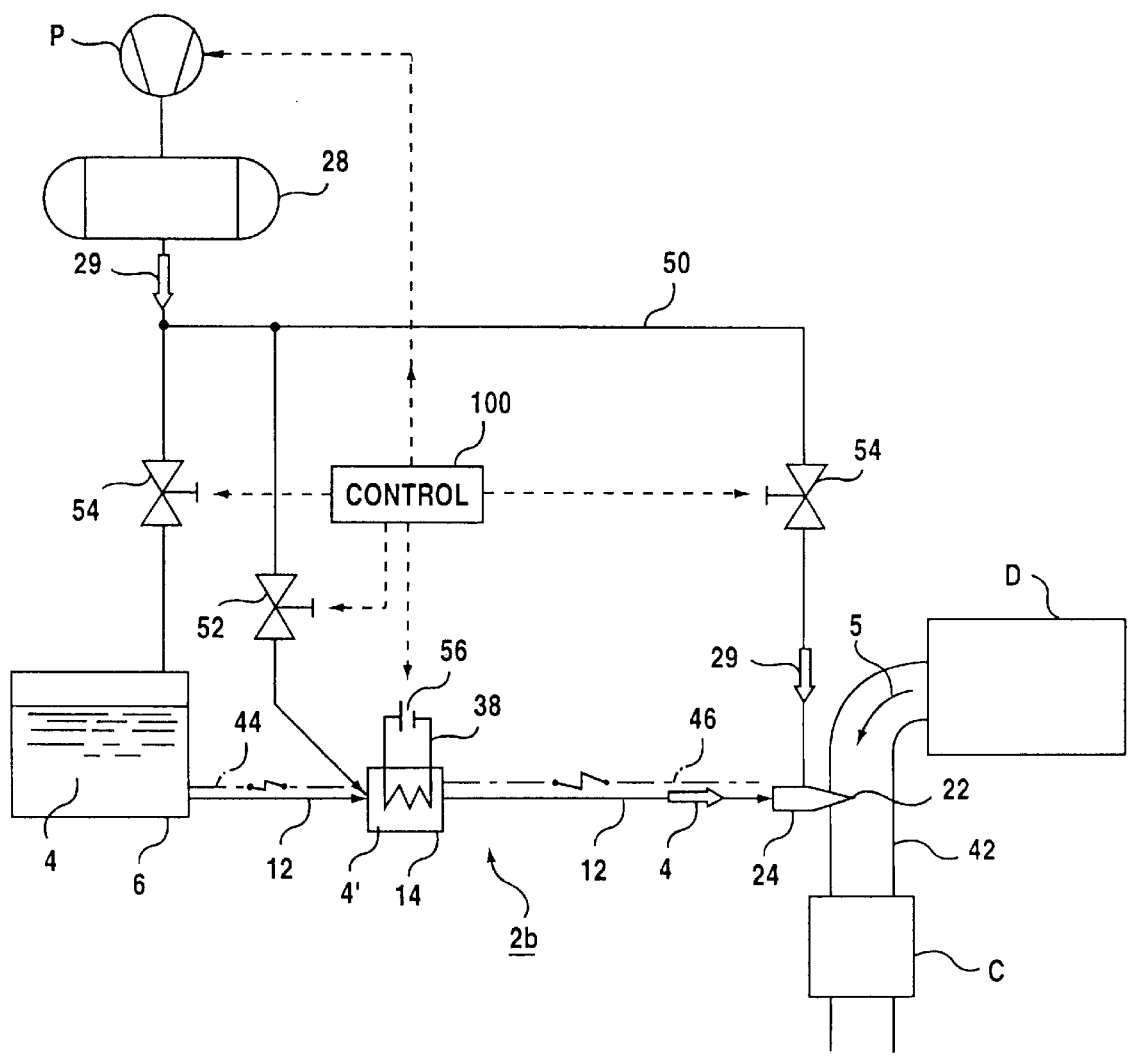
FIG. 3 is a schematic and block circuit diagram of a second embodiment of the invention.

FIG. 3 shows, by way of example, a device 2b in which the pump P and the pressurized container 28 are also used to spray the urea solution 4 from the container 6 through the supply line 12 into the exhaust-gas line 42. In this case, the outlet opening 22 is formed as an outlet opening of a nozzle 24. The pressurized air 29 in this case serves as a propellant for the nozzle 24 and a suitable pressurized-air line 50 permits control by the vehicle computer 100 ("control") through the use of valves 54.

In order to provide the urea solution 4 there is provided not only the normal tank 6, but also an intermediate container 14 connected in the liquid supply line 12. The volume of the intermediate container 14 contains only a fraction of the volume which the urea tank 6 is able to accommodate. The intermediate container 14 consequently provides a small volume that acts as a starting volume 4' which is precisely dimensioned in such a way that the combustion system D can be operated for a certain time (for example half an hour), which is needed for the entire system D to heat up. This warming-up time is sufficient to thaw the volume of the container 6 if the liquid 4 contained therein should have been frozen after a long operating shutdown.

The intermediate container 14 has a heater 38 which is formed, for example, as an additional electrical heater and can be fed from a battery 56. Advantageously, a heating line 44, 46 which can rapidly thaw the supply line 12 after a prolonged operating shutdown is also connected to the battery 56. A controllable shutoff valve 52 makes possible the delivery of liquid from the intermediate container 14 even during the time in which the liquid 4 in the container 6 may still be frozen.

A separate non-illustrated pressure equalization line can also be provided in this case between the liquid container 6 and the exhaust-gas channel 42 of the engine D, the pressurized-gas line can be formed in such a way that it makes a pressure equalization possible in the container 6 when pump P is shut down.

Figure 4:
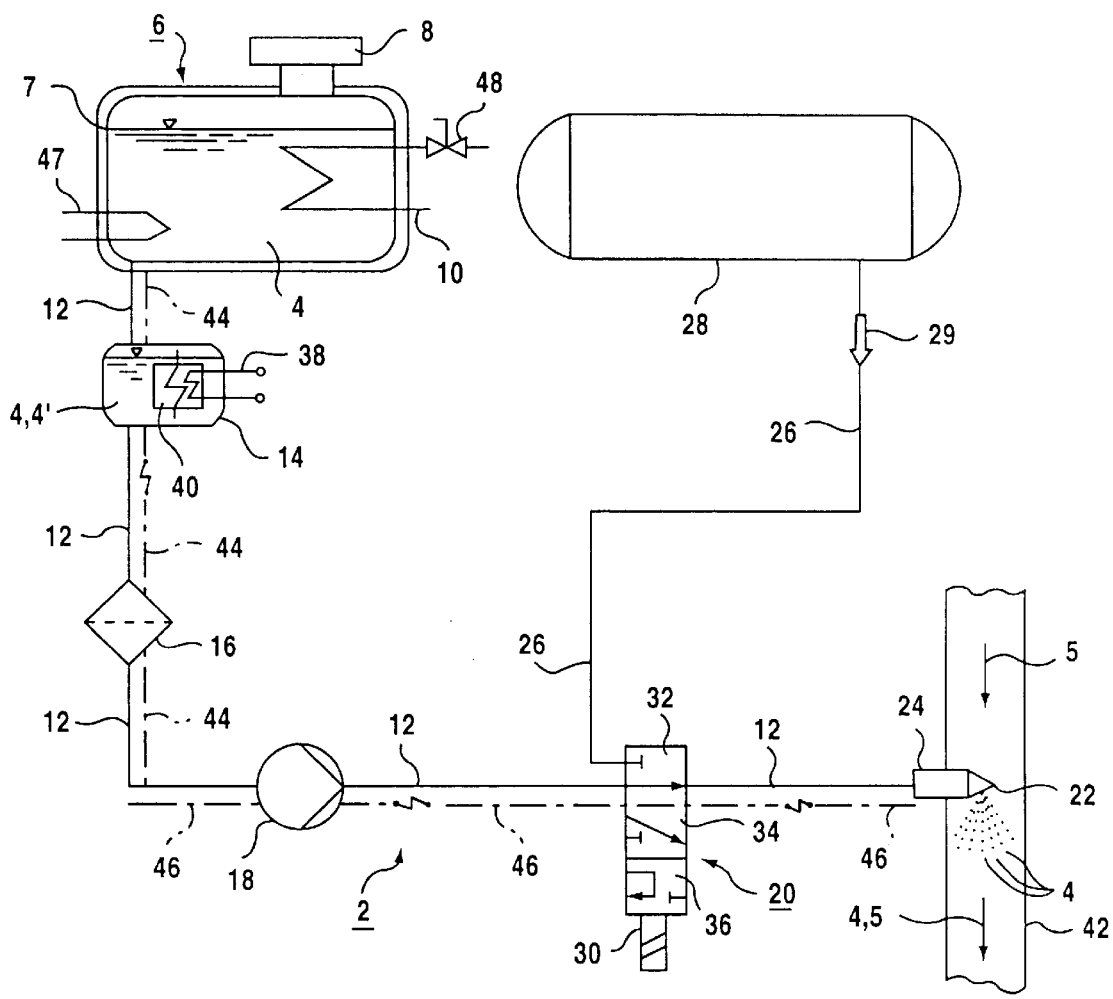
FIG. 4 is a schematic and block circuit diagram of a preferred combination of the two embodiments.

FIG. 4 is a schematic representation which shows how a device according to the first embodiment of the invention (device 2a in FIG. 1) can be combined with a device (device 2b in FIG. 3) according to the second embodiment to form a device 2, which introduces an aqueous urea solution 4 into a nitrogen-oxide-containing exhaust gas 5 carried in an exhaust-gas line 42 of an internal-combustion engine, that is not shown in further detail. For example, such an internal-combustion engine can be built into a utility motor vehicle, such as a truck, a locomotive or a ship, for example.

FIG. 4 reveals a tank 6, which is part of a reservoir for the urea solution 4 and has a thermal insulation 7, a venting device 8 and a heat exchanger 10. A urea supply line 12 which is connected to the tank 6 passes in the following order through a further separate container 14, a filter 16, a pump 18 and a back-flush valve 20 and terminates in a nozzle 24 provided with an outlet opening 22.

The back-flush valve 20 is constructed as a three/three-way valve. A pressurized-gas supply line 26 which starts from a pressurized-air container 28 is connected in the upper part of the back-flush valve 20. The back-flush valve 20 furthermore has a control input 30 which is connected in a non-illustrated manner to a vehicle computer for the control of the internal-combustion engine and of the pump 18 for the aqueous urea solution 4. The control input 30 determines the current function of the back-flush valve 20 which is constructed as three/three-way valve.

The back-flush valve 20 has three controllable modes of operation. A first function 32 provides an unimpeded transmission of the aqueous urea solution 4. A second function 34 provides a shutoff of the urea supply line 12 in the direction of the reservoir 6 and a blowing-out of the urea supply line 12 in the direction of the outlet opening 22. A third function 36 provides a shutoff of the urea supply line 12 in the direction of the outlet opening 22 and a blowing-out of the urea supply line 12 in the direction of the reservoir 6.

When the internal-combustion engine is started up, the urea solution 4 is completely contained in the containers 6 and 14. At an outside temperature below the freezing point of the aqueous urea solution 4, freezing of the latter may occur, in particular during prolonged shutdown times, despite the thermal insulation 7 of the tank 6. In such an operating case, a small starting volume 4' of the urea solution 4 in the container 14 which serves as intermediate container can then be thawed either after starting up the internal-combustion engine or even before starting up the internal-combustion engine, through the use of an electrical heater 38 which supplies a heat exchanger 40 with heat. The pump 18 then feeds this thawed urea solution 4 through the filter 16 and the back-flush valve 20 (when in the function 32) to the outlet opening 22. There the aqueous urea solution 4 is finely sprayed into the exhaust gas 5 which flows into the exhaust-gas line 42 of the internal-combustion engine. In order to ensure that the urea solution 4 does not freeze in the urea supply line 12 on its way to the outlet opening 22, a heater, which is indicated by dash-dot lines 44, 46 parallel to the urea supply line 12, may additionally be provided for the urea supply line 12. In this connection, the heat energy can be supplied electrically or, alternatively, through the coolant of the internal-combustion engine. Thus, it is possible for the urea supply line 12 to be constructed like a coaxial line in which the urea solution 4 flows in a central core and the coolant flows in an outer jacket. At the same time, the engine coolant, insofar as it is passed through the coaxial line, can be heated electrically.

As the operating time of the internal-combustion engine increases, the engine coolant heats up. It can flow, for example, into the heat exchanger 10 and, in this way, effect the thawing of the main quantity of the urea solution in the tank 6. The tank 6 additionally has a temperature sensor 47, for example a thermocouple, supplying a temperature signal. An adjustable valve 48 which sets a flow rate of the coolant in the heat exchanger 10, can be controlled through the use of the temperature signal. The quantity of heat transferred from the heat exchanger 10 to the urea solution 4 is therefore regulated through the use of the adjustable valve 48 by setting the flow rate of the coolant. In this way, temperature control of the urea solution 4 contained in the tank 6 is possible. This thermal control also achieves a positive side effect which is an increase in the metering accuracy of metering devices, that usually operate volumetrically. Furthermore, overheating of the urea solution 4 is avoided both in the tank 6 and in the intermediate container 14, which would otherwise already result in hydrolysis of the urea solution to form ammonia in the containers. However, the hydrolysis is undesirable. While the internal-combustion engine is being operated, the pressurized-air container 28 is loaded with pressurized gas 29. The vehicle computer 100, which is not described further herein, controls that quantity of urea solution 4 introduced into the exhaust gas 5 per unit time in accordance with the proportion of nitrogen oxide contained in the exhaust gas 5.

In connection with the operation of the internal-combustion engine, provision is made to remove the urea solution 4 from the frost-endangered parts of the device 2, in particular at outside temperatures below the freezing point of the aqueous urea solution 4 to avoid frost damage. These parts are, in particular, the filter 16, the pump 18, the back-flush valve 20, the nozzle 24 and the entire urea supply line 12. For this purpose, first the function 34 and then the function 36 of the back-flush valve 20 are therefore executed. The procedure could equally as well also be reversed.

Through the use of the function 34, the urea solution 4 which is still contained between the back-flush valve 20 and the nozzle 24 in the urea supply line 12 is blown out into the exhaust-gas line 42 through the use of the pressurized air 29. Since this section of the urea supply line 12 is of particularly short construction as compared with the total length of the urea supply line 12, only a small quantity of urea solution 4 is also introduced into the exhaust-gas line 42 which then no longer has exhaust gas 5 flowing through it. The urea solution 4 which is discharged may, for example, evaporate at the hot walls of the exhaust-gas line 42. The ammonia produced during the hydrolysis (evaporation) is adsorbed in the catalytic converter C, which is connected downstream of the nozzle 24 in the exhaust-gas line 42 and is not shown further herein.

Through the use of the function 36 of the back-flush valve 20, the entire remaining urea supply line 12, the pump 18 disposed therein and the filter 16 disposed therein are then flushed with the pressurized air 29 and rendered urea-free. Provision is made in this case for the size of the reservoir 14 serving as an intermediate container to be chosen in such a way that the volume is sufficient for accommodating the back-flushed urea solution 4 including an expansion volume filled with air. The back-flushed urea solution 4 is then used as a starting volume which can be thawed if necessary with only a small electrical heating power when the internal-combustion engine is started up again.

A venting line/pressure relief line which opens into the exhaust-gas line 42 upstream of the non-illustrated catalytic converter, as seen in the flow direction of the exhaust gas 5, for the purpose of nitrogen oxide reduction, can be connected to the reservoir 6 and, optionally, also to the reservoir 14 in a manner which is not shown further, but is disclosed, for example, in Published European Patent Application 0 577 853 A1.

The device 2 described above consequently ensures that at all times, regardless of the outside temperature, the quantity of urea necessary to catalytically convert the nitrogen oxides can always be provided during the operation of the internal-combustion engine. It also ensures that the entire device 2 is protected against frost damage at outside temperatures below the freezing point of the urea solution 4.

In addition, the invention can also be used in chemical industry systems in which liquids are carried through outdoor lines.

We claim:

1. A method for operating an exhaust-gas purification device, which comprises:

drawing a liquid from a reservoir through a supply line;

introducing the liquid into an exhaust gas in an exhaust of a combustion system during combustion, for chemical purification of the exhaust gas; and draining at least a section of the supply line with a pressurized gas during a shutdown of the combustion system.

2. The method according to claim 1, which comprises feeding the pressurized gas through a pressurized-gas inlet and a valve into the supply line between the reservoir and the exhaust of the combustion system, for draining a part of the supply line between the pressurized-gas inlet and the reservoir into the reservoir, and for draining a part of the supply line between the pressurized-gas inlet and the exhaust into the exhaust.

3. The method according to claim 1, which comprises introducing an aqueous urea solution as the liquid into the exhaust gas of an internal-combustion engine of a motor vehicle as the combustion system.

4. The method according to claim 3, which comprises operating the internal-combustion engine operated with an excess of air.

5. A method of operating an exhaust-gas purification device, which comprises:

drawing a liquid through a supply line from a reservoir having a given volume;

introducing the liquid into an exhaust gas in an exhaust of a combustion system during combustion, for chemical purification of the exhaust gas; and heating a starting volume of the liquid being smaller than the given volume with a heater and introducing the starting volume into the exhaust gas, no later than during startup of the combustion system.

6. The method according to claim 5, which comprises storing the starting volume of the liquid in a further container.

7. The method according to claim 3, which comprises introducing an aqueous urea solution as the liquid into the exhaust gas of an internal-combustion engine of a motor vehicle as the combustion system.

8. The,method according to claim 7, which comprises operating the internal-combustion engine operated with an excess of air.

9. A device for operating an exhaust-gas purification device, comprising:

a reservoir for a liquid;

a supply line connected between said reservoir and an exhaust-gas purification device;

a pressurized-gas inlet; and a valve connected between said pressurized-gas inlet and said supply line for introducing pressurized gas into said supply line in a direction towards said reservoir.

10. The device according to claim 9, wherein said valve is a back-flush valve disposed in said supply line.

11. The device according to claim 10, including further back-flushable structural components disposed in said liquid supply line between said valve and said reservoir.

12. The device according to claim 9, wherein said valve has a first state permitting a flow through said supply line from said reservoir to the exhaust-gas purification device and a second state permitting a flow through said supply line from said pressurized-gas inlet to said reservoir.

13. The device according to claim 12, wherein said valve has a third state in which said reservoir is closed.

14. The device according to claim 12, wherein said valve configuration has a state in which said pressurized-gas inlet is connected to the exhaust-gas purification device.

15. The device according to claim 13, wherein said valve configuration has a state in which said pressurized-gas inlet is connected to the exhaust-gas purification device.

16. The device according to claim 9, wherein the pressurized gas is introduced into said supply line at a location immediately alongside the exhaust-gas purification device.

17. The device according to claim 9, wherein the pressurized gas is introduced into said supply line at a location nearer to the exhaust-gas purification device than to said reservoir.

18. The device according to claim 9, including a device for heating said liquid supply line.

19. The device according to claim 18, wherein said reservoir has a given volume, and including an intermediate container associated with said heatable liquid supply line for a volume of the liquid smaller than said given volume.

20. The device according to claim 9, wherein said reservoir has a given volume, and including a heater for liquefying a starting volume of the liquid smaller than said given volume.

21. The device according to claim 20, wherein said heater for the starting volume is ad electrical heater.

22. The device according to claim 20, wherein said reservoir is a tank, and including an intermediate container accommodating the starting volume.

23. The device according to claim 22, including a device for heating at least said tank and said supply line with a liquid heating medium.

24. The device according to claim 20, including a device for heating said supply line electrically.

25. The device according to claim 20, including a device associated with said reservoir for at least one of temperature monitoring and temperature control.

26. An exhaust-gas purification system of a utility motor vehicle having an internal-combustion engine, the system comprising:

a reservoir for a liquid;

a supply line connected between said reservoir and an exhaust-gas purification device;

a pressurized-gas inlet; and a valve connected between said pressurized-gas inlet and said supply line for introducing pressurized gas into said supply line in a direction towards said reservoir.

27. The system according to claim 26, wherein the internal-combustion engine is operated with an excess of air.

* * * * *